No. 675,676. Patented June 4, 1901.
E. F. L. RUSSELL & C. M. BROWN.
BICYCLE LOCK.
(Application filed Nov. 16, 1900.)
(No Model.)
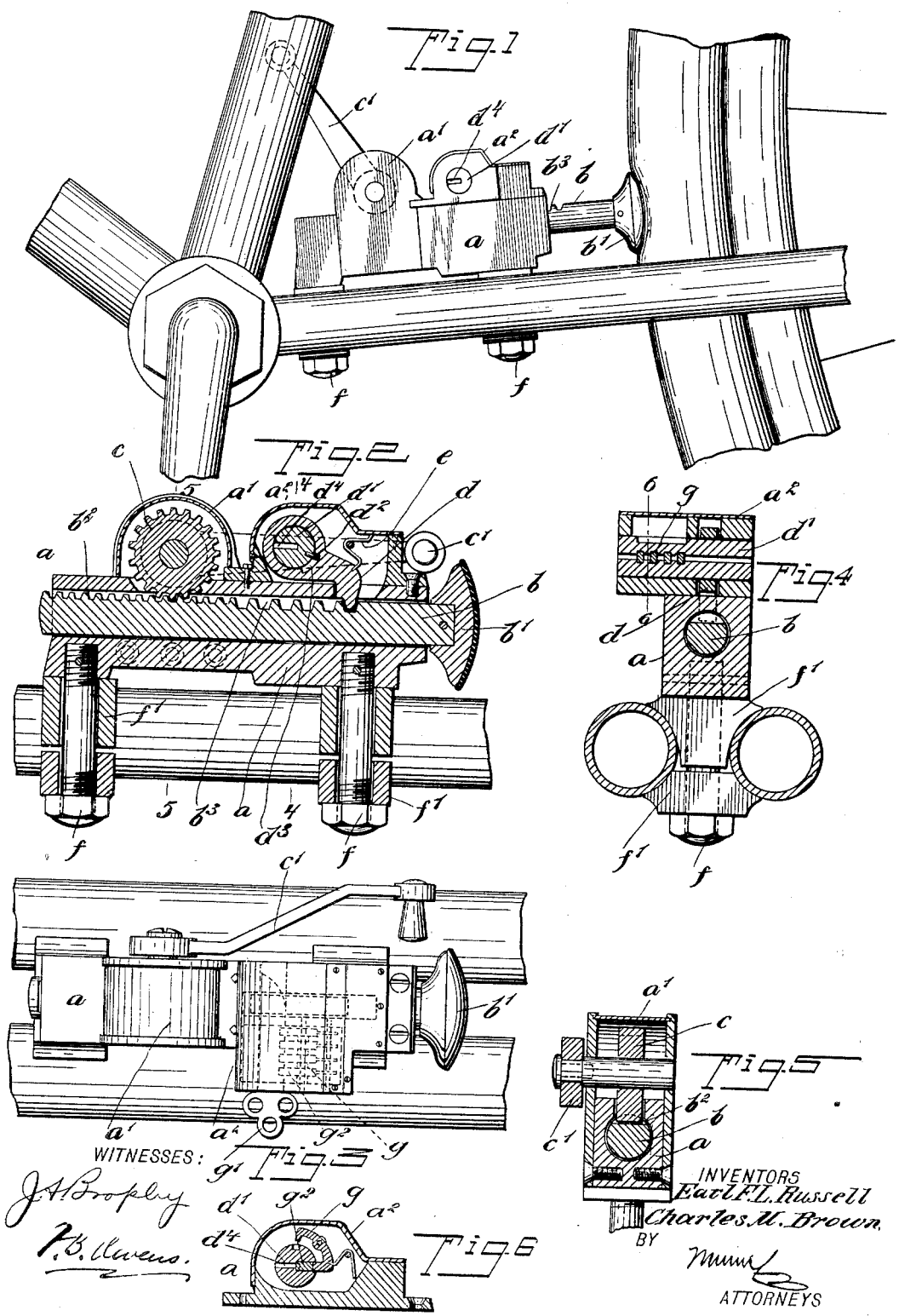
WITNESSES:
INVENTORS
Earl F. L. Russell
Charles M. Brown
BY
ATTORNEYS

UNITED STATES PATENT OFFICE.

EARL FRANCIS L. RUSSELL AND CHARLES MERION BROWN, OF DENVER, COLORADO.

BICYCLE-LOCK.

SPECIFICATION forming part of Letters Patent No. 675,676, dated June 4, 1901.

Application filed November 16, 1900. Serial No. 36,723. (No model.)

*To all whom it may concern:*

Be it known that we, EARL FRANCIS L. RUSSELL and CHARLES MERION BROWN, citizens of the United States, and residents of Denver, in the county of Arapahoe and State of Colorado, have invented a new and Improved Bicycle-Lock, of which the following is a full, clear, and exact description.

The purpose of this invention is to provide a superior device for rendering bicycles inoperative, and thereby preventing them from being stolen, which device comprises a bolt adapted to be forced against the tire of the bicycle-wheel, so that the wheel cannot be turned.

This specification is the disclosure of one form of the invention, while the claims define the actual scope thereof.

Reference is to be had to the accompanying drawings, forming a part of this specification, in which similar characters of reference indicate corresponding parts in all the views.

Figure 1 is a side view of the invention in use. Fig. 2 is a longitudinal section of the device. Fig. 3 is a plan view of the same. Fig. 4 is a cross-section on the line 4 4 of Fig. 2. Fig. 5 is a cross-section on the line 5 5 of Fig. 2; and Fig. 6 is a cross-section on the line 6 6 of Fig. 4, showing the ward-tumbler mechanism.

The lock may be attached to any part of the bicycle, provided its position is such as to enable it to work properly with the bicycle-wheel. As here shown, it is applied to the rear fork just rearward of the crank-hanger, so as to engage with the rear wheel, as indicated in Fig. 1.

The device comprises a suitable body portion $a$, wherein is mounted to reciprocate longitudinally a bolt $b$, the head $b'$ of which is covered with rubber or other yielding substance, so that it will not mar the tire of the bicycle. This bolt $b$ is provided on its upper side with teeth $b^2$, engaged by a pinion $c$, mounted in a housing $a'$, forming part of the body portion $a$. The axis of the pinion $c$ is provided with a finger-lever $c'$, enabling the pinion to be turned, whereby upon the revolution of the pinion the bolt $b$ may be moved back and forth to operative and inoperative position, as desired. Fig. 1 shows the bolt in operative position, and Fig. 2 shows it in inoperative position.

The bolt $b$ is locked in the position desired by a dog $d$, which is mounted loosely on an arbor $d'$, fitted to turn in a housing $a^2$, carried on the body portion $a$ and forming part thereof. The dog $d$ is allowed limited movement on the arbor $d'$ by means of a pin $d^2$, carried by the arbor and working in a slot $d^3$ in the dog. A spring $e$ is arranged in the housing $a^2$ to press the dog in place, and the arbor $d'$ is formed with a key-slot $d^4$, so that a key, as illustrated in Fig. 3, may be inserted into the slot in the arbor to throw the dog into disengaged position. Tumblers $g$ are provided to engage with the arbor $d'$ to hold the same immovable, and these tumblers are thrown out of engagement with the arbor by the action of a suitable key, (indicated at $g'$ in Fig. 3.) This key drives pins $g^2$, which are slidable laterally in the arbor and which when moved by a key of proper form swing the tumblers $g$ out of engagement with the arbor $d'$ and permit the arbor to be turned. If an improper key is employed, the arbor will not be released from the tumblers. The dog $d$ engages teeth $b^3$, formed on the upper side of the bolt $b$ forward of the teeth $b^2$. These teeth are so disposed with respect to the dog that the bolt $b$ may move forward, notwithstanding that the dog may be engaged therewith; but the formation of the dog is such as prevents the return of the bolt until the dog is raised from the position shown in Fig. 2. Therefore it will be seen that by throwing the finger-lever $c'$ the bolt may be moved forward to lock the bicycle, and then the bolt cannot be released until the proper key is inserted in the slot $d^4$ of the arbor $d'$ and the dog lifted out of engagement with the plunger. Then the finger-lever $c'$ may be thrown reversedly and the parts will assume the position shown in Fig. 2.

The device may be attached to a bicycle by any desired means, the form and dimensions of which must necessarily vary according to the position of the bicycle which is occupied by the device. As here shown, we have provided two bolts $f$, which screw into the under side of the body a and which clamp against the bicycle two pairs of clip-blocks f' of the form best shown in Fig. 4. By these means the lock is held rigidly on the bicycle.

Having thus described our invention, we claim as new and desire to secure by Letters Patent—

1. A bicycle-lock comprising a body part, a bolt carried thereby and serving to engage a mobile part of the bicycle, means working with the bolt to advance and retract the same, a dog serving to hold the bolt in applied position, a key-slotted arbor on which the dog is mounted, an intermediately-pivoted tumbler mounted independently of the arbor and having one end normally engaged with the arbor to hold it, the other end of the tumbler being engageable with the arbor to hold it when the tumbler is thrown excessively, and a key-actuated pin slidably carried in the arbor and adapted to engage the tumbler to throw it to releasing position.

2. The combination of a key-slotted arbor, a dog carried thereon, an intermediately-pivoted tumbler mounted independently of the arbor and normally engaged at one end with the arbor, the other end of the tumbler being engageable with the arbor upon the excessive movement of the tumbler to prevent movement of the arbor, and a pin slidably carried in the arbor and actuated by a key to throw the tumbler to releasing position.

In testimony whereof we have signed our names to this specification in the presence of two subscribing witnesses.

EARL FRANCIS L. RUSSELL.
CHAS. MERION BROWN.

Witnesses:
ERNEST R. COMBE,
HUGH STEWART.